Oct. 4, 1960 A. E. BRENNEMANN ET AL 2,955,281

FERROELECTRIC MEMORY SYSTEM

Filed Dec. 27, 1955 3 Sheets-Sheet 1

INVENTORS
ANDREW E. BRENNEMANN
RALPH B. De LANO, JR.
DONALD R. YOUNG

John E. Dougherty Jr.
AGENT

INVENTORS
ANDREW E. BRENNEMANN
RALPH B. De LANO, JR.
DONALD R. YOUNG

BY John E. Dougherty Jr.
AGENT

Oct. 4, 1960 A. E. BRENNEMANN ET AL 2,955,281

FERROELECTRIC MEMORY SYSTEM

Filed Dec. 27, 1955 3 Sheets-Sheet 3

INVENTORS
ANDREW E. BRENNEMANN
RALPH B. De LANO, JR.
DONALD R. YOUNG

BY John E. Dougherty Jr.
AGENT

United States Patent Office 2,955,281

Patented Oct. 4, 1960

2,955,281

FERROELECTRIC MEMORY SYSTEM

Andrew E. Brennemann, Ralph B. De Lano, Jr., and Donald R. Young, Poughkeepsie, N.Y., assignors to International Business Machines Corporation, New York, N.Y., a corporation of New York Filed Dec. 27, 1955, Ser. No. 555,453

7 Claims. (Cl. 340—173.2)

The present invention relates to a memory system and more particularly to a memory system which utilizes ferroelectric switching matrices as the driving means for a ferroelectric storage matrix.

In many of the data storage systems utilized in present day computers, binary data is stored in individual storage elements arranged in an array of coordinate columns and rows. The storage elements are located at the junctions of the coordinate columns and rows and any element may be addressed by coincidently pulsing the address lines for the particular column and row which define its location. Such a coordinate system has the advantage that the number of address lines necessary to allow for the selective addressing of any position in the array is greatly reduced. In order that a particular type of storage element be suitable for use in such an array, it is necessary that, in at least one of its characteristics, it is capable of selectively attaining one or the other of two stable states of equilibrium and thus be capable of storing either a binary one or a binary zero. A second requirement is that these stable states be distinguishable. One such storage element, now well-known, is the ferromagnetic core which exhibits two stable states of magnetic flux remanence. These states, because of the magnetic hysteresis characteristic of such materials, may be readily distinguished by observing the voltage produced in an output winding when the core is subjected to a magnemotive force applied in a predetermined direction. Ferroelectric capacitors meet with both of the above mentioned requirements and may also be utilized as storage elements in such arrays. These capacitors exhibit the two required states of equilibrium in that, when a polarizing field is applied in either of two opposite directions, they will retain a large degree of polarization in the direction of application after the polarizing field is removed. The plot of polarization versus applied field intensity for ferroelectric capacitors shows a hysteresis loop similar to that of the B-H curve for a ferromagnetic material. The actual capacitance and thus the impedance which a ferroelectric capacitor presents to an applied switching voltage varies according to the portion of the hysteresis loop being traversed, and the aforesaid stable states of polarization may be distinguished by observing the impedance presented when a polarizing voltage is applied in a predetermined direction.

When such capacitors are connected in an array, as above described, information stored in any individual capacitor may be read therefrom by coincidently applying polarizing pulses of predetermined magnitude and opposite polarity to the address lines for the column and row which define its location. These polarizing pulses are termed half select pulses in that individually each is of insufficient magnitude to produce the field intensity required to switch the capacitor from one of its stable states of polarization to the other. However, when such half select pulses of opposite polarity are coincidently applied to the capacitor at the junction of the addressed column and row, the electrostatic field thereby produced is of sufficient intensity to switch the capacitor from one state of polarization to the other. A necessary incident of such an addressing procedure is that each of the nonselected capacitors in a selected row or column that is addressed is subjected to these half select pulses. These capacitors may be at either state of polarization according to the information stored therein. If we assume that the polarity of the half select pulses applied is such as to switch the capacitors to their binary zero representing condition, then the half select pulses will tend to switch any of the nonselected capacitors, which happen to be in the state of polarization corresponding to a binary one, to the opposite state of polarization. Though these half select pulses are not sufficient to switch these capacitors, they reduce the remanent polarization. It has been found that after ferroelectric capacitors have been subjected to a large number of these half select pulses tending to switch their state of polarization, the remanent polarization is no longer distinguishable and the information stored therein is lost. This phenomenon has been termed "walking" and has heretofore presented a major obstacle to the successful utilization of ferroelectric capacitors in memory matrices.

The broad object of this invention is to provide an improved ferroelectric memory system.

A more particular object is to provide such a system wherein individual capacitors in a coordinate array may be selectively addressed an indefinite number of times without disturbing information stored in other capacitors in the array.

These objects are carried out in accordance with one feature of the invention through an improved mode of operation demonstrated in connection with a preferred embodiment of a storage system which includes a storage matrix of coordinate columns and rows of ferroelectric capacitors which are selectively switched for both reading and writing of information by a pair of biased ferroelectric switch matrices. The storage matrix is in the form of a single crystal of barium titanate having a plurality of coordinate column and row electrodes on its opposite faces, which electrodes with the barium titanate between them at their junctions form the individual storage capacitors. One of the aforementioned biased ferroelectric switch matrices is connected to drive the column electrodes of the storage matrix and the other is connected to drive the row electrodes. The ferroelectric capacitors in the row switch matrix are normally biased in a sense opposite to those in the column switch matrix. These capacitors are switched by coincident pulses from the address pulse sources and, when switched, first provide coincident pulses of opposite polarity to the selected row and column electrodes of the storage matrix to thereby read out the information stored in the capacitor at their junctions. Upon termination of the address pulses, the biased switch capacitors are then effective to supply pulses of equal magnitude and opposite polarity to the same electrodes, which pulses may be controlled to again coincide if it is desired to rewrite the same information in the addressed capacitor. Whether or not rewriting is desired the equal and opposite pulses supplied by the ferroelectric switch matrices will serve to restore to their original remanent condition any nonselected capacitors in a selected row or column which was disturbed by the original half select read pulses. Since pulses of opposite polarity are successively applied, any nonselected capacitor subjected to a series of half select pulses, will, regardless of its state of remanent polarization, receive a pulse of polarity tending to restore its remanent condition after each pulse which tends to reduce it. In this manner the "walking" tendency is greatly reduced and the capacitors may be subjected to an exceedingly high number of half select pulses without losing information stored therein.

Thus, a further object of the invention is to provide a ferroelectric switching matrix.

Another object is to provide a memory system which utilizes such a matrix to drive the coordinate columns and rows of a ferroelectric storage matrix.

Another feature of the invention lies in the provision of a novel ferroelectric pulse circuit adapted for use in such a system.

Other objects of the invention will be pointed out in the following description and claims and illustrated in the accompanying drawings, which disclose, by way of example, the principle of the invention and the best mode, which has been contemplated, of applying the principle.

Figures 2, 3, 3A:
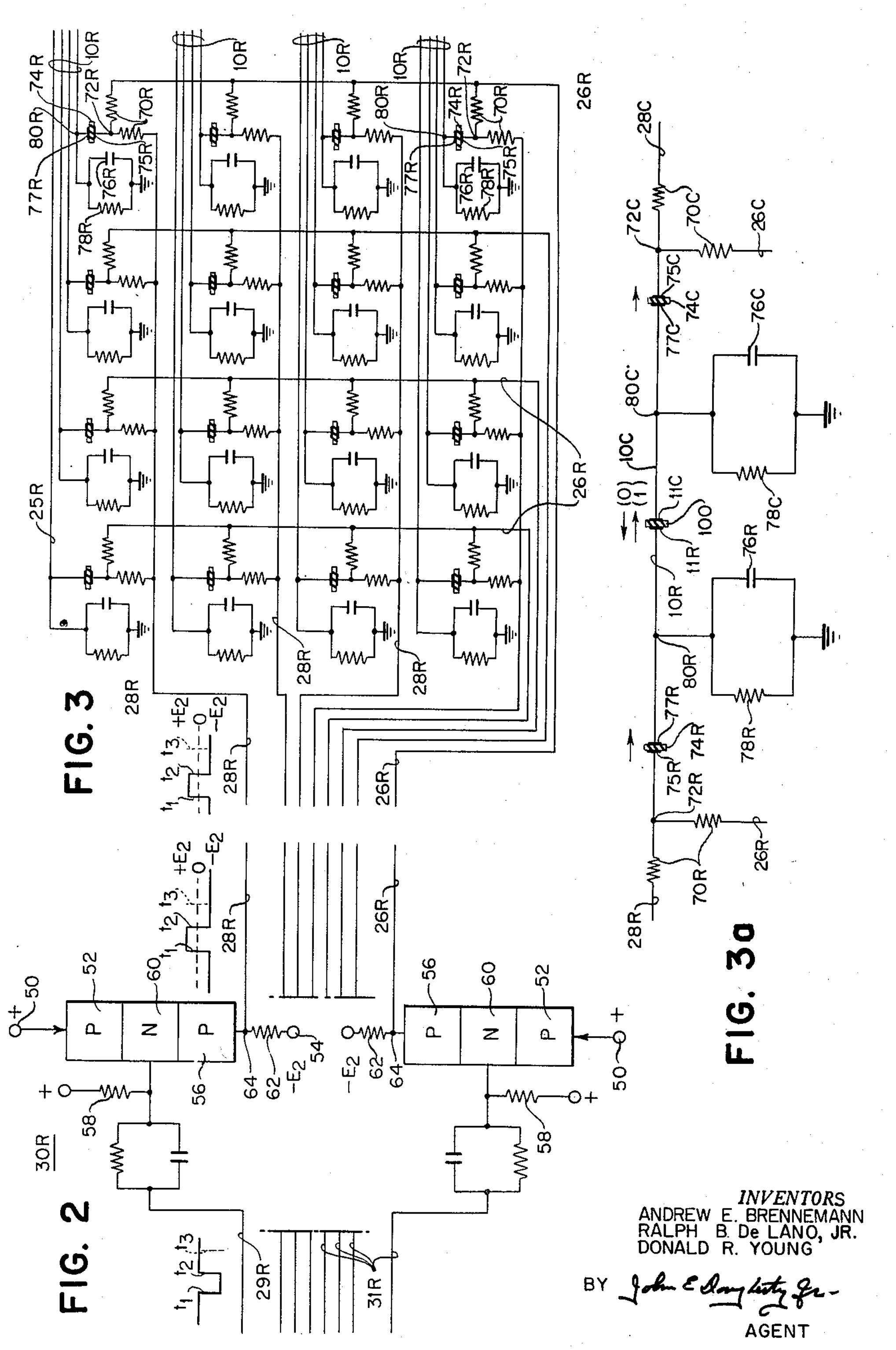
Fig. 2 is a more specific diagrammatic showing of the row inverters shown in block form in Fig. 1.
Fig. 3 is a more specific diagrammatic showing of the switch matrices shown in block form in Fig. 1.

Fig. 3*a* is a diagram of the basic ferroelectric switching circuit utilized in the preferred embodiment of the present invention.

Figure 1:
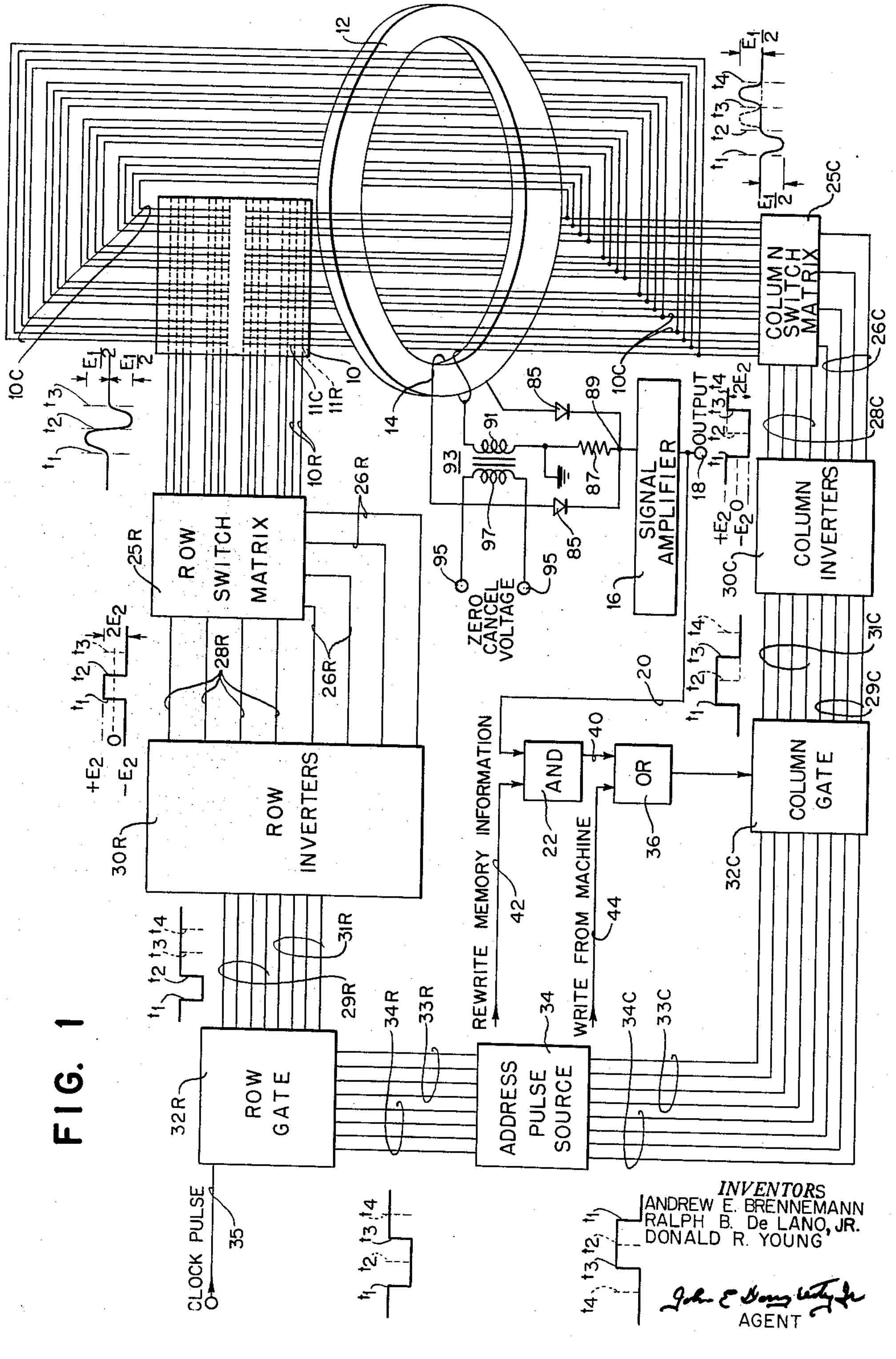
Fig. 1 is a schematic showing, in block diagram form, of the components and their manner of interconnection in a preferred embodiment of the invention.
Figures 4, 5, 6:
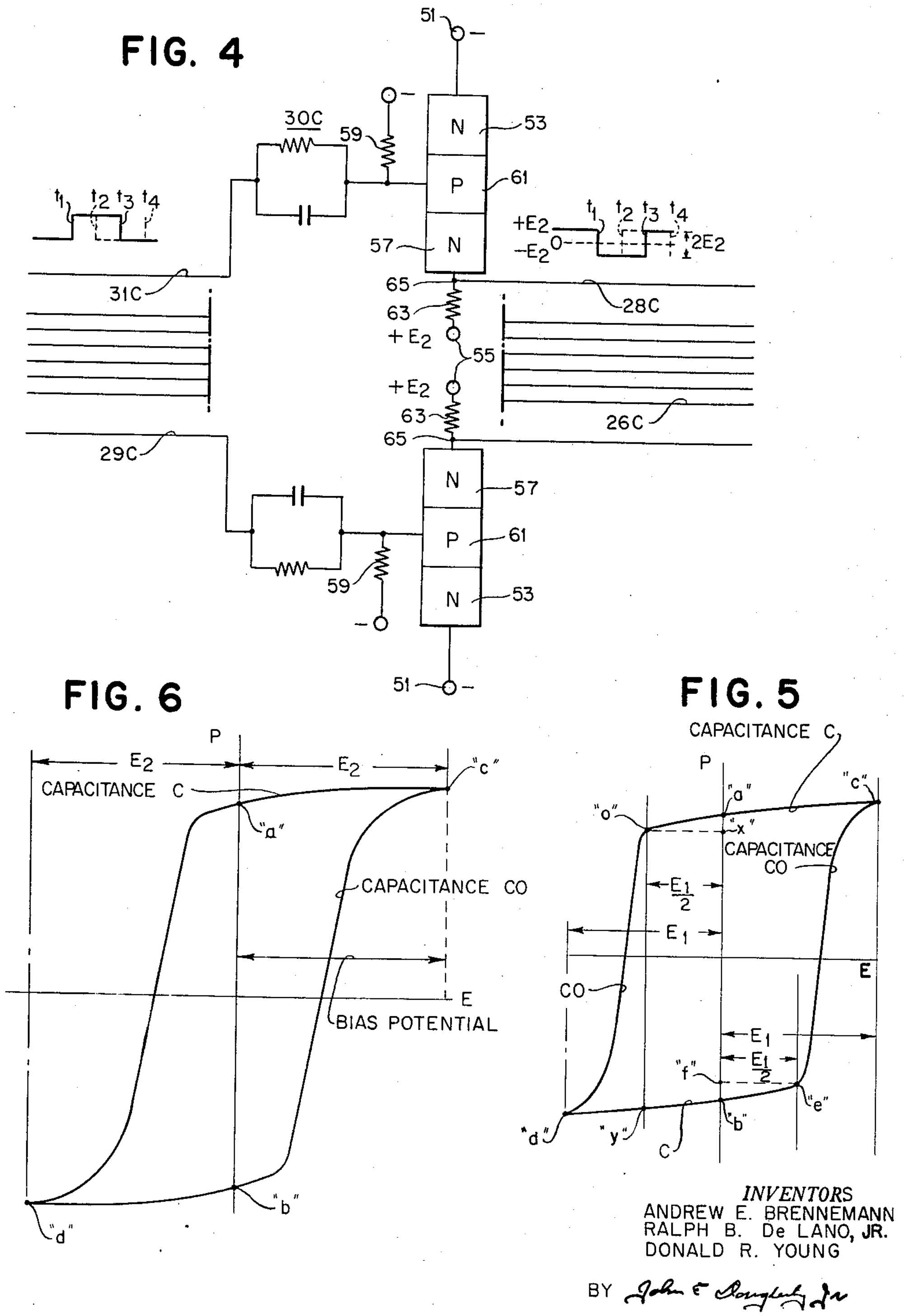

Fig. 4 is a more specific diagrammatic showing of the column inverters shown in block form in Fig. 1.

Figs. 5 and 6 are diagrams of typical hysteresis loops for crystal barium titanate.

A detailed description of various components of the memory system will be preceded by a general description of the system as it is shown in block form in Fig. 1. In this figure a block 10 represents a ferroelectric memory matrix having 256 individual storage positions defined by 16 vertical and 16 horizontal coordinates. This matrix is here disclosed, by way of a preferred embodiment, as a single crystal of barium titanate having 16 coordinate horizontal row electrodes 11R and 16 coordinate vertical column electrodes 11C. These electrodes together with the barium titanate between them at their junctions form individual capacitors which are herein utilized as the individual storage elements of the matrix. An example of such a matrix is shown and described in the copending application Serial No. 392,615, filed November 15, 1953, in behalf of D. R. Young and assigned to the assignee of this application. The matrix utilized might also be in the form of a plurality of individual ferroelectric capacitors each having separate electrodes which are connected in an array of coordinate horizontal and vertical channels. An example of such a matrix is described in the above mentioned copending application. Note should be made that other ferroelectric materials such as potassium niobate, lead titanate or guanidine aluminum sulphate hexahydrate may be utilized in the novel memory system of the present invention, the choice of barium titanate in the preferred embodiment being made only by way of example.

Connected to each of the electrodes of the barium titanate crystal is an address lead, which leads for the row electrodes are designated 10R and for the column electrodes are designated 10C. The output of the matrix is by way of single transformer core 12 through which the column leads 10C pass so that each forms a single turn primary winding thereon. As shown in Fig. 1, there are two sets of column leads inductively associated with the core 12 and connected to the column electrodes 11C. These electrodes are divided into two equal length sections with the sets of leads 10C connected to the opposing sections wound in opposite directions around the output core. Such an arrangement is provided to assist in cancelling out spurious pulses from nonselected capacitors in a selected row or column which may additively develop an erroneous output pulse. The output circuit includes a secondary winding 14 on the core 12 which winding is connected, through a circuit network that will be described in detail hereafter, to a signal amplifier 16 which produces output pulses at a terminal 18. A parallel conductor 20 from the signal amplifier 16 is connected as one input to an AND circuit 22, which circuit, in a manner later to be described, controls rewriting in the memory matrix 10. Both the amplifier 16 and AND circuit 22 may be of conventional components well-known in the art.

The row electrodes 11R of the memory matrix 10 are connected by their corresponding address leads 10R to a row switch matrix 25R. There are four horizontal or row input leads 28R and four vertical or column input leads 26R to this switch matrix which is effective to address a selected row electrode 11R when pulses are coincidently applied to one horizontal and one vertical input lead. The column address leads 10C are similarly connected to a column switch matrix 25C and may be addressed in the same manner. Both of these switch matrices, as will later be explained in detail, utilize ferroelectric capacitors as switching elements in providing the matrix memory selecting pulses. The horizontal and vertical coordinate leads 28R and 26R for the row matrix switch 25R receive pulses from a series of transistor inverters 30R which in turn receive pulses which are transmitted from an address pulse source 34 through a row gate 32R. The coordinate horizontal and vertical leads 28C and 26C to the column switch matrix 25C are similarly addressed except that the pulses transmitted thereto are under the control of a column gate 32C which, in a manner later to be described, controls writing and rewriting of information in the memory matrix 10.

The normal cycle of operation of the memory system is a read and write cycle; that is, during the first part of a cycle information is read out of a selected storage position, and during the latter part of the cycle the same information or new information may be written in that storage position. The rewriting and writing operations, which occur during this latter half of a cycle of operation, are under the control of the column gate 32C which is in turn controlled by the aforementioned AND circuit 22 and an OR circuit 36.

Reading of information out of the storage matrix 10 is accomplished by coincidently pulsing a selected row address line 10R and a selected column address line 10C with pulses of the proper polarity and sufficient magnitude jointly to switch the capacitor formed at the junction of the electrodes to that state of remanent polarization which is herein representative of a binary zero.

Fig. 5 shows a typical hysteresis loop for a barium titanate crystal of the type used in the storage matrix of the preferred embodiment of the present invention. In the plot of polarization (P) versus applied voltage (E) there shown, the points "*a*" and "*b*" represent the two remanent states of polarization which the material exhibits with no voltage applied. In the discussion to follow we will refer to the point "*a*" as a binary one representing state, and to the point "*b*" as a binary zero representing state.

When a particular storage position in the memory matrix 10 is to be addressed, negative pulses from the address pulse source 34 are simultaneously supplied to one of the leads 33R and one of the leads 34R which extend to the row gate 32R, and positive pulses are supplied to one of the leads 33C and one of the leads 34C which extend to the column gate 32C. These gates always allow pulses to pass during the first or reading portion of the cycle of operation and these negative and positive pulses pass through the gates 32R and 32C to the row inverters 30R and column inverters 30C, respectively.

Considering a cycle of operation to extend from $t_1$ to $t_4$ time, the pulses supplied by the address pulse source 34 extend, as shown immediately adjacent the leads therefrom, from $t_1$ to $t_3$ time. The row gate 32R is normally open to allow the transmission of pulses therethrough but is closed at $t_2$ time of every cycle by a pulse which is applied to a lead 35 by a clock pulse source not shown.

These clock pulses are effective to cut off gate 32R at $t_2$ time for the duration of each cycle. Thus, the pulses transmitted to the lead 31R and 29R, as shown graphically above these leads, extend only from $t_1$ to $t_2$ time. The column gate 32C is normally open at $t_2$ time and the pulses transmitted to the leads 31C and 32C, as shown in full lines above these leads, normally extend from $t_1$ to $t_3$ time. Thus, where $t_2$ time equally divides the interval $t_1$ to $t_3$, the pulses applied to the column inverters 30C are normally of opposite polarity and twice the duration of the pulses applied to the row inverters 30R. The pulses thus applied to the row and column inverters are inverted and amplified and then applied to the selected horizontal and vertical coordinate leads to the column and row switch matrices 25C and 25R. According to which ones of the leads 31R, 31C, 29R and 29C are pulsed, one of the vertical leads 26R and one of the horizontal leads 28R to the row switch matrix 25R and one of the vertical leads 26C and one of the horizontal leads 28C to the column switch matrix 25C may be pulsed. Both pulses thus applied to the coordinate leads of the row switch matrix 25R are positive and those applied to the coordinate leads of the column switch matrix 25C are negative. The ferroelectric switch capacitors at the junctions of the coordinate leads for each switch matrix are normally biased opposite to the pulses thus applied, and these capacitors, when switched, apply to the selected electrodes of the memory matrix pulses of the shape shown immediately adjacent the address leads 10R and 10C. Thus, from $t_1$ to $t_2$ time, the selected row address line 10R and column address line 10C will be energized by pulses of equal and opposite polarity. These pulses are termed half select pulses and their polarity is such as to polarize the capacitor at the junction of the electrodes addressed to the position "*d*" on the hysteresis loop of Fig. 5. Each of these pulses has a magnitude of one-half $E_1$ volts, where $E_1$ is the voltage required, during the time interval $t_1$–$t_2$, to polarize the capacitor to either of its saturable states, which states are designated "*c*" and "*d*" in Fig. 5. As shown, each one-half $E_1$ pulse is of itself insufficient to switch the capacitor from one state to the other, but when, as here, equal and opposite pulses of this magnitude are applied simultaneously to the opposing terminals of the capacitor, the total potential drop across the barium titanate is equal to $E_1$ and is sufficient to switch the capacitor from one direction of polarization to the other. Thus, if the capacitor addressed is originally in the remanent state representative of a binary one (point "*a*"), the half select read pulses, coincidently applied from time $t_1$ to $t_2$, will cause the hysteresis loop for the capacitor to be traversed from "*a*" to "*d*" and, upon termination of the pulses, to the remanent state of polarization "*b*," which is indicative of a binary zero. When the capacitor addressed is originally in the condition "*b*" representative of a binary zero, the half select read pulses merely cause the loop to be traversed to the point "*d*" and thence back to the original point "*b*" upon termination of the pulses.

As shown by the pulse shapes adjacent to the address leads 10R, between $t_2$ and $t_3$ time, a pulse of equal and opposite polarity is applied by the row switch matrix to the row electrode addressed. When no writing is to be accomplished during a cycle of operation, no pulse is applied to the addressed column electrode during this interval, and thus this pulse on the row electrode does not switch the addressed capacitor. From $t_3$ to $t_4$ time a similar pulse, of a polarity opposite to that previously applied from $t_1$ to $t_2$ time, is then applied to the addressed column electrode, which pulse is not of itself sufficient to switch the addressed capacitor.

These write pulses of equal and opposite polarity which follow the half select read pulses, when applied, as above described, during succeeding time intervals are not effective to write information in the addressed memory position. However, these pulses are advantageous in that, being of equal magnitude and opposite polarity to the half select read pulses, they greatly lessen walking and the possibility of gradually destroying information stored in nonselected capacitors in the selected row and column addressed. During the read interval of an operating cycle each of these nonselected capacitors is subjected to a half select read pulse which, if the capacitor is originally in the condition representative of a binary one, causes the hysteresis loop therefor to be traversed from the point "*a*" to "*o*" and thence back to point "*x*." Thus, the remanent polarization is lessened and though the showing of Fig. 5 is greatly enlarged for purposes of illustration, it is found that, if a capacitor storing a bit of information is subjected to a large number of these half select pulses, the polarization will be decreased to a point where it is no longer distinguishable. In a system operated in accordance with applicants' mode, each such pulse is followed by a pulse of equal magnitude and opposite polarity which tends to restore it to its original state of polarization. Tests have shown that a bit of information thus stored can withstand over a thousand times as many half select pulses. Where a nonselected capacitor is at point "*b*" on the hysteresis loop of Fig. 5, representing a binary zero, the half select read pulse applied causes the loop to be traversed from this point to point "*y*" thence back again to "*b*." The write pulse which follows causes the loop to be then transversed from the point "*b*" to the point "*e*" and thence back to a lesser state of remanent polarization designated by point "*f*." However, the next applied read pulse is of equal magnitude and opposite polarity and tends to restore the capacitor to its original state of polarization at point "*b*" on the hysteresis loop.

When it is desired to rewrite information in the capacitor addressed, the above described write pulses applied to the selected row and column address leads 10R and 10C are controlled to coincide. This is accomplished under the control of the AND circuit 22, which circuit will produce a pulse on its output lead 40 when pulses are coincidently applied to its input leads 20 and 42. When information is to be rewritten, a pulse will be applied at $t_2$ time, by machine circuitry not shown, to lead 42. At this time the amplifier circuit 16 will produce a pulse at the output terminal 18 if the capacitor addressed during the cycle contained a binary one. The condition of the capacitor addressed is distinguished on readout by electrically observing the capacitance presented to the coincident half select read pulses. These pulses, as previously described, will tend to polarize the addressed capacitor to that state which is indicative of a binary zero, so that, if a capacitor is originally in the binary zero representing state, the hysteresis loop will be traversed from point "*b*" in Fig. 5 to point "*d*" and then back to point "*b*." Where a binary one is stored and the capacitor addressed is at the point "*a*" of the hysteresis loop, the loop will be traversed from this point to point "*d*" and thence back to the opposite state of remanent polarization at point "*b*." The capacitance of a ferroelectric capacitor is equal to $$\left(\frac{dP}{dE}\right)(A)$$

where A is equal to the area normal to the direction of polarization. Thus, it may be seen that the capacitance C presented by a capacitor traversing its loop horizontally along the segment "*bd*" is much less than the capacitance $C_0$ presented when the loop is traversed along vertical portions of the segment "*ad*." It is this difference in capacitance presented to the half select read pulses which allows the output circuit to produce a pulse of distinguishable amplitude at terminal 18 when a binary 1 is stored in the capacitor addressed. This pulse is transmitted by lead 20 to the AND circuit 22 so that when a pulse is applied at $t_2$ time to lead 42, the AND circuit will produce a pulse on its output lead 40. This pulse will be transmitted through OR circuit 36 to cut off the column gate 32C at $t_2$ time. The pulses applied to the coordinate leads 26C and 28C of the column switch matrix 25C and thence to the selected column address lead 10C will then be of the shape shown dotted adjacent to these leads. As shown, the write pulse on this lead now coincides with the equal and opposite pulses applied from $t_2$ to $t_3$ time to the selected address lead 10R. These pulses applied coincidently to the selected capacitor may be termed half select write pulses since they will cause the polarization loop for that capacitor to be traversed along the segment "*bc*" and thence back to the opposite state of remanent polarization at point "*a*," in which state the capacitor is said to store a binary 1. When the addressed capacitor is in the binary zero representing state and thus presents the capacitance C to the half select read pulses, the pulse developed at the output terminal 18 and transmitted by lead 20 to AND circuit 22 is of insufficient amplitude to cause a pulse to be produced on the output lead 40. Thus, gate 32C will remain open and the pulse applied to the selected column address lead 10C will be as shown in the full lines adjacent those leads; the column write pulse is provided between $t_3$ and $t_4$ time and does not coincide with the write pulse applied to the row select address lead 10R so that the selected capacitor remains at point "*b*" representative of a binary zero.

When during the cycle of operation new information is to be written in the addressed capacitor, no pulse is applied by the machine circuitry through lead 42 to AND circuit 22. However, where a binary one is to be written during a cycle, a pulse will be applied to lead 44 at $t_2$ time which pulse will be transmitted by the OR circuit 36 to cut off the column gate 32C at this time. The write pulse applied to the column address lead 10C then coincides with that applied to the row address lead 10R and these coinciding half select write pulses switch the addressed capacitor to its binary one representing state at point "*a*" of the hysteresis loop. It should be noted that, during the read portion of each cycle, the equal and opposite half select read pulses applied to the selected capacitor read information therefrom and, where the capacitor originally stored a binary one, restore it to its binary zero representing state. Thus, the addressed capacitor will always be in its binary zero representing state at $t_2$ time and the same cycle of operation may be utilized to rewrite the same information or to write new information in the addressed memory position. Note should also be made of the fact that, whether or not the write pulses applied to the row and column address leads 10R and 10C coincide, all of the nonselected capacitors in the selected row and column will be subjected to alternate pulses of equal magnitude and opposite polarity.

*Row inverters*

The function of the row inverters, represented by the blocks 30R and 30C in Fig. 1, is to invert pulses received from the address pulse source 34, and to amplify these pulses sufficiently to render them capable of driving the ferroelectric capacitors in switch matrices 25R and 25C. For a system of the storage capacity illustrated there are four address lines 31R and four address lines 29R from the row gate 32R to the row inverters 30R, and likewise two groups of 4 lines 31C and 29C from the column gate 32C to the column inverters 30C. In order to select a particular one of the row address leads 10R to the memory matrix, it is necessary that a negative pulse be supplied at $t_1$ time to one of the leads 31R and one of the leads 29R to the row inverters 30R. As is shown in Fig. 2, each of these row inverters 30R includes a PNP junction transistor having a positive potential applied from a terminal 50 to the emitter element 52 and a negative potential from a terminal 54 through a resistor 62 to the collector element 56. The potential applied at terminal 54 is designated as $-E_2$ volts. A positive biasing potential is applied through a resistor 58 to the base electrode 60 of each transistor to normally bias the transistor below its cut-off condition and thereby prevent any appreciable current flow across the junction between its base 60 and its emitter 52. In this condition the leads 26R and 28R connected from the inverters to the row matrix switch 25R are normally maintained at the negative potential of the sources coupled to terminals 54. When the address pulse source 34 applies a negative pulse to one of the leads 31R or 29R, the cut-off bias applied through resistor 58 of the corresponding transistor will be overcome to thereby lower the potential of the base below the cutoff potential. The transistor then becomes conductive causing an increased current to flow through the collector 56 and thence through resistor 62 to negative potential terminal 54. The junction 64 between the collector 56 and resistor 62 is thereby raised from its normal potential of $-E_2$ volts. The magnitude of the pulses applied by the address pulse source and the amplifying characteristic of the inverters is such that the corresponding lead 28R or 26R to the row switch matrix is raised to a potential equal in magnitude and opposite in polarity to the potential of $-E_2$ volts normally on that lead. This is illustrated by the pulse shape shown graphically above the leads 26R and 28R, the normal potential level being $-E_2$ volts, and a pulse applied by address pulse source 34 at $t_1$ time being effective to raise the potential to $+E_2$ volts which represents a total change of $+2E_2$ volts on the particular lead. These pulses are coincidently supplied to one horizontal lead 28R and one vertical coordinate lead 26R to the row switch matrix 25R during each cycle of operation.

The inverters for the column switch matrix 25C are of similar design with the exception that, as is shown in Fig. 4, the transistors utilized are of the NPN type with their bases 61 normally biased through resistors 59 more negative than their emitters 53 to thereby prevent appreciable current flow across the emitter base junction. The collectors 57 are normally biased at $+E_2$ volts by a pulse source coupled to terminals 55 to normally hold the leads 26C and 28C to the column switch matrix 25C at a potential of $+E_2$ volts. Positive pulses transmitted from the address pulse source 34 are applied to these inverters through the gate 32C, it being necessary to pulse one of the leads 31C and one of the leads 32C to select a particular address lead 10C to the storage matrix 10. The application of such a positive pulse to one of these transistors causes the cut-off bias applied through resistor 59 to be overcome thereby raising the potential of the base 61 and allowing an increased current to then flow through the collector 57 and through resistor 63. This current will cause the potential at junction 65 to be lowered from $+E_2$ to $-E_2$ volts, thereby applying a pulse of $-2E_2$ volts to the corresponding lead 26C or 28C of the column switch matrix 25C.

*Ferroelectric switch matrices*

The ferroelectric row and column switch matrices are similar in design and operation and an explanation of the row switch matrix 25R, as shown in Fig. 3, is considered sufficient to provide an adequate understanding of both devices and their function in the system. The only difference in the operation of the switch matrices is that the leads 26R and 28R to the row switch matrix 25R are normally biased at a potential of $-E_2$ volts and addressed with pulses of $+2E_2$ volts from $t_1$ to $t_2$ time, whereas the leads 26C and 28C to the column switch matrix 25C are normally biased at potential of $+E_2$ volts and addressed with pulses of $-E_2$ volts which pulses are initiated at $t_1$ time and extend to either $t_2$ or $t_3$ time according to whether or not writing is to take place in the particular cycle of operation. Referring now to Fig. 1 the input leads 26R and 28R and output leads 10R of the row matrix switch have shown adjacent thereto the pulses applied to and developed by that switch. The row matrix switch has four horizontal coordinate leads 28R and four vertical coordinate leads 26R. These leads, as is shown in Fig. 3, are connected at their intersections through resistors 70R to common terminals 72R. Each terminal 72R is connected to one electrode 75R of a corresponding ferroelectric capacitor 74R, there being 16 such capacitors, one provided at each junction of the four by four coordinate array illustrated. Each other electrode 77R of the capacitors 74R is connected by the row address leads 10R to the memory matrix 10. Each of these address leads 10R is shunted at a junction 80R to ground through a parallel connected capacitor 76R and resistor 78R. The function of these parallel connected capacitors and resistors is to serve as a voltage divider when the corresponding ferroelectric capacitor is subjected to a switching voltage thereby allowing the desired potential to be developed on the selected address lead 10R only when the capacitor is switched from one state of polarization to the other.

Fig. 6 shows a hysteresis loop typical of those obtained for barium titanate crystals such as are utilized in the ferroelectric capacitors of such a switch matrix. In their normal condition with biasing potential of $-E_2$ having been originally applied, these capacitors will be polarized to the saturation state designated by the letter "*c*." It should be here noted that the position "*c*" represents a saturation polarization in one direction and the point "*d*" a saturation polarization in the opposite direction. The application of a positive potential to one terminal of a ferroelectric capacitor will polarize the capacitor in the same direction as would the application of a negative pulse to the other electrode of the capacitor. Thus, where as in the present invention pulses are applied to a plurality of such capacitors, it is the direction of the polarization thereby produced in each and not necessarily the polarity of the individual pulses applied which must be considered. It is for this reason that the capacitor 74R is said to be at point "*c*" on its hysteresis loop when the negative biasing potential is applied and is switched to point "*d*" upon the coincident application of the positive address pulses. The logic of such a designation will appear more clearly when the operation of the switching circuitry is described with particular reference to Fig. 3*a*.

Once the normal biasing potentials on the horizontal leads 28R and vertical leads 26R have polarized the capacitors in the matrix to this saturation state, the continued application of these voltages will cause little or no current to flow through the saturated capacitors 74R. The saturated capacitors then present an extremely high impedance to the polarizing voltage applied in the same direction and, as a result, the terminals 72R are maintained essentially at $-E_2$ volts and the junctions 80R and thus, the address leads 10R are maintained at essentially ground potential. When at $t_1$ time pulses are applied by the transistor pulse inverters 30R to one horizontal lead 28R and one vertical lead 26R of the switch matrix, the terminal 72R at the intersection of these leads is raised from $-E_2$ to $+E_2$ volts. This represents a voltage change of $+2E_2$ volts across the addressed capacitor 74R which, as shown in Fig. 6, is sufficient to cause the capacitor to be polarized to saturation in the opposite direction; the hysteresis loop being traversed along the segment "*cad*."

The output pulse to be transmitted to the corresponding row address lead 10R is developed at junction 80R. When at $t_1$ time the selected leads 26R and 28R are raised to a potential of $+E_2$ volts, there is an instantaneous current surge through the resistors 70R, the ferroelectric capacitor 74R and capacitor 76R to ground, and the entire voltage drop initially occurs across resistor 70R thereby raising the potential at terminal 72R from $-E_2$ to 0 volts. This initial change at terminal 72R causes the voltage drop across the addressed ferroelectric capacitor 74R to be quickly reduced to zero thereby causing its polarization to be decreased along the segment "*ca*" of the loop of Fig. 6 to the negative remanent state. This effect is rapid since the capacitor 74R presents a very low capacitance C at the segment "*ca*" is traversed. Thereafter the current decreases as the capacitor 74R is polarized in the opposite direction along section "*ad*" and capacitor 76R is charged. The capacitor 76R is chosen to have a capacitance less than the capacitance $C_0$ presented by the ferroelectric capacitor 74R as the segment "*ad*" is traversed, thereby causing the major portion of the voltage drop occurring across the capacitors as they are charged to initially appear across capacitor 76R. Thus, terminal 80R is, after the initial current surge, raised to its maximum potential of one-half $E_1$ volts. As previously mentioned, the voltage required to switch one of the capacitors in the memory matrix is $+E_1$ volts which is applied in the form of half select pulses of one-half $E_1$ volts on the row and column electrodes. As capacitor 74R is polarized in the opposite direction and capacitor 76R charged, the current decreases thereby causing the potential at terminal 72R to approach $+E_2$ volts and that at terminal 80R to again approach ground potential. These potentials are attained shortly before $t_2$ time, at which time the $+2E_2$ pulses on leads 26R and 28R are terminated thereby causing the above described procedure to be reversed and a negative pulse of —one-half $E_1$ volts is developed at terminal 80R. In this way the desired equal and opposite pulse from $t_2$ to $t_3$ time is applied to the selected row address lead, which pulse as previously explained inhibits the walking tendency and also serves as a half select pulse for writing and rewriting of information in the selected memory capacitor.

When, as above, the pulses from $t_1$ to $t_2$ time are applied to raise the potential of selected horizontal and vertical coordinate leads 26R and 28R of the switching matrix 25R to $+E_2$ volts, the nonselected capacitors 74R connected to the selected horizontal and vertical leads will not be switched. This is so, since the application of the potential $+E_2$ volts to one of the coordinate leads, while a corresponding lead remains at $-E_2$ volts, causes current to flow through the pair of resistors 70R. Thus, the voltage drop from $-E_2$ to $+E_2$ volts will be split across these resistors 70R causing the junction 72R to be essentially at zero potential. This change at junction 72R from $-E_2$ to zero potential represents a total change of $+E_2$ volts which, as shown in Fig. 6, is sufficient only to cause the polarization loops of associated capacitors to be traversed from the saturation point "*c*" to the remanent state "*a*." When this portion of the curve is traversed, the potential drop at the junction 80R remains essentially unchanged from ground potential since there is then no potential drop across the capacitor 76R.

As previously mentioned the only differences between the operation of the row and column switch matrices are that they are oppositely biased and addressed with pulses of opposite polarity, and the duration of the address pulse applied to the row switch matrix is from $t_1$ to $t_2$ time whereas those applied to the column switch matrix may be from $t_1$ to either $t_2$ or $t_3$ time. Thus, when writing is to be accomplished and the address pulses to the column switch matrix 25C are terminated at $t_2$ time, the wave form applied to the column address lead 10C is an inverted duplicate of that applied to the row address lead 10R. Where the address pulses applied are not terminated at $t_2$ time, but extend to $t_3$ time, the pulse form applied to the column address leads 10C will be as shown in full lines adjacent those leads in Fig. 1. As there shown, a pulse applied at $t_1$ time will, by $t_2$ time, have completely switched the addressed capacitor 74C in the column switch matrix to its negative saturation at point "*d*" of Fig. 6. Thus, at $t_2$ time the entire voltage drop will occur across the ferroelectric capacitor 74C and the associated column address lead 10C will be returned to zero potential. When at $t_3$ time the address pulse is terminated, the addressed capacitor 74C in the column switch matrix 27C will be switched back to its negative saturation state thereby producing the positive pulse shown between $t_3$ and $t_4$.

Note should be made of the fact that voltage developed at the junction 80 in both the row and column and switch matrices are in magnitude one-half $E_1$ volts which pulses are, as previously explained with reference to Fig. 5, sufficient when coincidently applied as half select pulses of opposite polarity to switch addressed capacitor in the memory matrix 10. It should also be noted that, since the non-selected capacitors connected to selected horizontal and vertical leads 26R, 28R, 26C, 28C in both switch matrices are immediately returned by the bias potentials to their normal saturation states after the application of the address pulses, there is no walking problem encountered in either switch matrix. A further heretofore troublesome phenomenon, known as hysteresis loop fatigue or decay, is also eliminated by the bias normally applied to the capacitors in the switch matrices. Decay and fatigue are terms used to described the tendency of the hysteresis loop of a ferroelectric capacitor to shrink as a result of repeated switching from one state of polarization to the other. It has been found that where, as here, the capacitors are subjected to an applied bias between switching operations, this decay of the hysteresis loop is to a large degree eliminated.

The operation of a ferroelectric capacitor 74R and a corresponding capacitor 74C for the column switch matrix 25C during the reading and writing of information in the memory matrix 10 may be best understood by a consideration of a Fig. 3*a* which depicts in diagrammatic form the basic circuitry involved in each such operation. In this figure the number 100 designates a particular ferroelectric capacitor in the memory matrix which capacitor is located between a particular row electrode 11R and a particular column electrode 11C. The address leads 10R and 10C for these electrodes are shown with their connections to associated capacitors 74R and 74C in the row and column switch matrices, respectively. When in the normal condition with negative biasing potential applied by the coordinate leads 28R and 26R to capacitor 74R, this capacitor will, as previously explained, be polarized to the saturation state represented by the letter "*c*" in Fig. 6. The arrow immediately above this capacitor is used to designate a polarization in this direction, and the basis of this type of notation is that a positive potential applied to the electrode at the tail of the arrow or a negaive potential applied to the electrode at the point of the arrow will switch the direction of polarization in the capacitor. Thus, in the normal condition with the positive biasing potential applied to the corresponding coordinate leads 28C and 26C, the direction of polarization in capacitor 74C in the column switch matrix will, when viewed in the continuous circuit of Fig. 3*a*, be the same as that of capacitor 74R in the row switch matrix.

As has been previously noted, it is desired that the address pulses applied to the switching capacitors be of a polarity to switch the addressed memory capacitor from its binary one representing state to its binary zero representing state. Thus, when the capacitor 100 is representing a binary one, the direction of polarization will be the same as that in the switching capacitors 74C and 74R. The point "*a*" in Fig. 5 has been chosen to be representative of the binary one representing state of a memory capacitor 100 and thus, the point "*c*" is logically chosen as being representative of the state of polarization in the switching capacitors 74R and 74C when subjected to the normal biasing potentials.

When address pulses from the address pulse source cause a positive pulse to be applied to the electrode 75R of capacitor 74R and a negative pulse to be coincidently applied to the electrode 75C of capacitor 74C, these pulses will be of a polarity to switch both of these capacitors and also of a polarity to switch the memory capacitor 100 when it is in the binary one representing condition. As previously explained the capacitance presented by a ferroelectric capacitor is relatively high when subjected to a pulse of sufficient magnitude and proper polarity to switch its direction of polarization. When the memory capacitor 100 is in the binary one representing position and is switched by the address pulses, a relatively large current will flow through the capacitor and thus, through the column address lead 10C. Where the memory capacitor 100 is in the binary zero representing condition the positive pulse developed at terminal 80R and the negative developed at terminal 80C upon the application of the read pulses at $t_1$ time will not be of the proper polarity to reverse the direction of polarization of this capacitor. The capacitor 100 will then present a relatively low capacitance to these pulses causing the majority of the current to flow through the parallel connected resistor 78R and capacitor 76R and the similarly connected resistor 78C and capacitor 76C to ground. These capacitors and resistors being connected in parallel to the memory capacitor also prevent the larger portion of the read pulses from being developed across the relatively high impedance then presented by this memory capacitor and ensure that capacitors 74R and 74C will be switched. Upon the termination of the read pulses at $t_2$ time, the addressed capacitor will always be in the binary zero representing condition and will be then polarized in the same direction as the switching capacitors. Thus, the write pulses when coincidently applied will always be of the proper polarity to switch all three capacitors and the operation is similar to that above described. Where the write pulses are applied successively or where only one of the switching capacitors 74C, 74R, shown in Fig. 3*a*, is addressed, the voltage applied to the memory capacitor will be insufficient to reverse its direction of polarization.

*Output circuitry*

Reading out of information stored in the individual capacitors formed at the junctions of the intersecting electrodes on the memory matrix 10 is accomplished by a transformer core 12. As is shown in Fig. 1, the row address leads 10C pass through this core 12 so that each lead forms a single primary winding thereon. As previously mentioned a binary one is said to be stored in a memory capacitor when it is polarized to that remanent state, which is designated by the letter "*a*" in Fig. 5 and a binary zero is stored when a memory capacitor is in the opposite remanent state designated by the letter "*b*" in this figure. The half select read pulses supplied to the address leads 10R and 10C at $t_1$ time are of the proper polarity to switch a memory capacitor from the binary one representing state to the binary zero representing state. The coincident application of these pulses to an addressed memory capacitor in the binary one representing state will cause the polarization hysteresis loop for the capacitor to be traversed from point "*a*" to point "*d*." Upon termination of the read pulse at $t_2$ time the capacitor will assume its opposite state of polarization at point "*b*." As explained above, the addressed memory capacitor, during such a switching operation, draws a relatively high current. This current passes through the addressed column lead 10C, which is wound on core 12, producing a flux change in the core which flux change in turn causes a current to flow in the secondary winding 14. Since the column address leads 10C are split and wound in opposite directions on the core 12, this flux change and thus the current flow in the output winding 14 may be in either direction. For this reason the output winding 14 is connected through a full wave rectifier to the output signal amplifier 16. The rectifier comprises a three legged circuit having diodes 85 connected in the outer legs to allow current flow in only one direction in each. As a result the current flow through the middle leg is always in the same direction and the output pulse developed across resistor 87 and applied to the signal amplifier will always be of the same polarity.

When the addressed memory capacitor is in the binary zero representing condition, that is in the remanent state of polarization designated by point "*b*" of Fig. 5, the half select pulses applied at $t_1$ time will tend to polarize that capacitor further in the same direction along the segment "*bd*." As explained above, the memory capacitor under these conditions draws a relatively small current. Though slight this current flow through the column address lead 10C will produce a flux change in transformer core 12 and a current flow in the output winding 14. However, the output pulse produced at terminal 89 when amplified by the transistor signal amplifier 16 would be of a much smaller amplitude than that produced when a binary one is stored in the addressed capacitor and these pulses might be easily distinguished. However, in order to obviate the need for distinguishing at the output, a secondary winding 91 of a transformer 93 is connected in the rectifier circuit. A voltage, called a zero cancel voltage, is applied during readout time to a pair of terminals 95 to cause a voltage to be induced in the primary winding 97 of transformer 93. The voltage applied and the transformer are designed to cause the voltage induced in the secondary winding 91 to be just sufficient to cancel out the voltage induced in winding 14 when a zero is stored in the addressed memory capacitor.

It has been previously mentioned that the vertical electrodes 11C are divided into two sections, each of which is connected to a corresponding address lead 10C. Referring to Fig. 1, it may be seen that the leads to the sections of each column electrode 11C are wound on the core 12 in opposite directions. Further it may be be seen that the column address leads are so arranged that half of the leads to the lower sections of the column electrodes 11C are wound in one direction on core 12 and the other half in the opposite direction. The arrangement of the leads to the upper sections of the column electrodes is similar, half of the leads thereto being wound in one direction and the other half in the opposite direction on the transformer core 12. The purpose of this arrangement is to eliminate the effect of disturb pulses which are the current pulses produced on the nonselected column address leads 10C as a result of the half select pulse applied to the selected row address lead 10R. When a terminal 80R in the row switch matrix 25R has its potential raised from ground + one-half $E_1$ volts, each of the memory capacitors in the particular row connected to that terminal will be subjected to this half select pulse. According to their state of polarization, the hysteresis loops for these capacitors will be traversed either along the segment "*ao*" or along the segment "*by*." The impedance presented by capacitors as either segment is traversed is relatively large thereby limiting the current flowing in the column address leads 10C. Regardless of the state of these nonselected capacitors, the current through each will flow in the same direction. If the address leads where wound in the same direction, the flux produced by the current in each lead 10R would be additive and would produce a substantial output current in winding 14. Since, however, the 16 address leads connected to both the upper and lower sections of the column electrodes 11C are arranged so that eight are wound in one direction and eight in the opposite direction around core 12, the flux produced by these currents will be largely cancelled out. The nonselected capacitors on the selected column address lead 10C will also draw small currents when a half select pulse is applied to that address lead. Since the column electrodes are split into equal sections and the leads from the two sections of each electrode are wound in a different direction around core 12, the flux produced by these nonselected cores will also, to a large degree, be cancelled out.

The output signal amplifier 16, AND circuit 22, OR circuit 36, and gates 32R and 32C may all be of conventional design. The function of the amplifier 16 is to amplify the output pulses developed at terminal 19. The function of AND circuit 22 is to produce an output pulse at $t_2$ time of a cycle during which a pulse is impressed on rewrite lead 42 and during which the memory capacitor addressed contained a binary one thereby causing a pulse to be produced on lead 20. Row gate 32R is cut off each cycle at $t_2$ time so that the pulses applied to the row inverters 30R extend only from $t_1$ to $t_2$ time whereas the column gate 32C is normally not cut off thereby allowing the pulses extending from $t_1$ to $t_3$ time to reach the column inverters 30C. The OR circuit 36 will cut off this gate at $t_2$ time when it is desired to either rewrite stored information or to write new information in the addressed capacitor. Rewriting is controlled by AND circuit 22 and the writing of new information by circuitry not shown which is effective to pulse lead 44 at $t_2$ time. When a memory capacitor in the binary one condition is addressed during a particular cycle by the read pulses applied from $t_1$ to $t_2$ time, the output pulse developed at terminal 18 will be extended sufficiently by the amplifier 16 to be effective with the pulse applied at $t_2$ time to conductor 42 to actuate AND circuit 22.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a data storage system wherein binary information is stored in a coordinate memory array of ferroelectric capacitors each of which is capable of assuming a first and a second state of remanent polarization and each of which is connected between one of a plurality of row conductors and one of a plurality of column conductors, a first array of ferroelectric switching capacitors each having one of its electrodes coupled to a corresponding one of said row conductors, a second array of ferroelectric switching capacitors each having one of its electrodes coupled to a corresponding one of said column conductors, means for applying a biasing potential of one polarity to the other electrodes of the switching capacitors in said first array and a biasing potential of opposite polarity to the other electrodes of the switching capacitors in said second array to cause said switching capacitors to be polarized in the same direction, pulse means controllable to apply to a selected switching capacitor in said first array a pulse of polarity and magnitude to reverse the direction of polarization in said capacitor and thereby cause a pulse to be produced on a selected one of said row conductors during a first time interval after the application of said pulse, said pulse means being controllable to simultaneously apply to a selected switching capacitor in said second array a pulse of a polarity and magnitude to reverse the direction of polarization in that capacitor and thereby cause a pulse to be produced on a selected one of said column conductors during said first time interval, and means for terminating the pulse applied by said pulse means to said selected switching capacitor in said first array at the end of said first time interval to cause to be produced on said selected row conductor during a second time interval a pulse of a polarity opposite to that produced thereon during said first time interval, the pulse applied by said pulse means to said selected switching capacitor in said second array being normally terminated at the end of said second time interval to cause to be produced on said selected column conductor during a third time interval a pulse of a polarity opposite to that produced thereon during said first time interval, each of said pulses produced on said conductors being of itself of insufficient magnitude to switch the polarization of a capacitor in said coordinate memory array from one of its remanent states to the other but being sufficient when coincidently applied to said selected conductors to switch that capacitor in the memory array which is connected between them.

2. In a data storage system wherein binary information is stored in a coordinate memory array of ferroelectric capacitors each of which is capable of assuming a first and a second state of remanent polarization and each of which is connected between one of a plurality of row conductors and one of a plurality of column conductors, a first array of ferroelectric switching capacitors each having one of its electrodes coupled to a corresponding one of said row conductors, a second array of ferroelectric switching capacitors each having one of its electrodes coupled to a corresponding one of said column conductors, means for applying a biasing potential of one polarity to the other electrodes of the switching capacitors in said first array and a biasing potential of opposite polarity to the other electrodes of the switching capacitors in said second array to cause said switching capacitors to be polarized in the same direction, pulse means controllable to apply to a selected switching capacitor in said first array a pulse of polarity and magnitude to reverse the direction of polarization in said capacitor and thereby cause a pulse to be produced on a selected one of said row conductors during a first time interval after the application of said pulse, said pulse means being controllable to simultaneously apply to a selected switching capacitor in said second array a pulse of a polarity and magnitude to reverse the direction of polarization in that capacitor and thereby cause a pulse to be produced on a selected one of said column conductors during said first time interval, means for terminating the pulse applied by said pulse means to said selected switching capacitor in said first array at the end of said first time interval to cause to be produced on said selected row conductor during a second time interval a pulse of a polarity opposite to that produced thereon during said first time interval, the pulse applied by said pulse means to said selected switching capacitor in said second array being normally terminated at the end of said second time interval to cause to be produced on said selected column conductor during a third time interval a pulse of a polarity opposite to that produced thereon during said first time interval, each of said pulses produced on said conductors being of itself of insufficient magnitude to switch the polarization of a capacitor in said coordinate memory array from one of its remanent states to the other but being sufficient when coincidently applied to said selected conductors to switch that capacitor in the memory array which is connected between them, means for detecting whether any of said capacitors in said memory array is switched during said first time interval, and gating means responsive to said detecting means for terminating said pulse applied by said pulse supply means to said switching capacitor in said second array at the end of said first time interval.

3. In a data storage system wherein binary information is stored in a coordinate array of ferroelectric capacitors each of which is capable of assuming two stable states of remanent polarization and each of which is connected between one of a plurality of row conductors and one of a plurality of column conductors, a first array of ferroelectric switching capacitors each having one of its electrodes coupled to a corresponding one of said row conductors, a second array of ferroelectric switching capacitors each having one of its electrodes coupled to a corresponding one of said column conductors, means for applying a biasing potential of one polarity to said switching capacitors in said first array and a biasing potential of opposite polarity to said switching capacitors in said second array to cause said capacitors in both arrays to be polarized in the same direction, means for coincidently applying to a selected switching capacitor in each of said arrays an address pulse of a polarity opposite to that applied to said capacitors by said biasing means, and means for terminating the address pulse applied to one of said selected capacitors before the address pulse to the other of said selected capacitors is terminated.

4. In a ferroelectric memory system a ferroelectric memory capacitor capable of assuming a first remanent state of polarization in a first direction and a second state of polarization in the opposite direction and initially in one or the other of said remanent states, a first and a second ferroelectric switching capacitor each capable of being polarized in said first and second directions, said memory capacitor having one of its electrodes coupled to one electrode of said first switching capacitor and its other electrode coupled to one electrode of said second switching capacitor, means applying a biasing potential of one polarity to the other electrode of said first switching capacitor and a biasing potential of opposite polarity to the other electrode of said second switching capacitor to cause both said capacitors to be polarized in said first direction, means for coincidently applying to said other electrodes of each of said capacitors an address pulse of a polarity opposite that applied by said biasing means thereby reversing the direction of polarization in both said switching capacitors, said coincidently applied address pulses being also effective when said memory capacitor is initially polarized in said first direction to cause the direction of polarization therein to be reversed, means for detecting whether the direction of polarization in said memory capacitor is reversed, and gating means normally effective to terminate said address pulse applied to said first switching capacitor before the address pulse applied to said second switching capacitor is terminated but controllable by said detecting means to terminate said address pulses at the same time.

5. In a ferroelectric memory system, a ferroelectric memory capacitor capable of assuming a first remanent state of polarization in a first direction and a second remanent state of polarization in the opposite direction, a first and a second ferroelectric switching capacitor each capable of being polarized in said first and second directions, said memory capacitor having one of its electrodes coupled to one electrode of said first switching capacitor and its other electrode connected to one electrode of said second switching capacitor, means applying a potential of one polarity to the other electrode of said first switching capacitor and a potential of opposite polarity to the other electrode of said second switching capacitor to maintain both said switching capacitors polarized in said first direction, a pair of impedance elements each connected between a corresponding one of said one electrodes of said switching capacitors and a reference potential to allow said memory capacitor to be in either of said remanent states when said switching capacitors are polarized in said first direction, and means for coincidently applying to said other electrodes of said switching capacitors a pulse of a polarity opposite that applied by said biasing means to reverse the direction of polarization in all three of said capacitors when said memory capacitor is in said first remanent state, said coincidently applied address pulses being effective to reverse the direction of polarization in both said switching capacitors when said memory capacitor is in said second remanent state.

6. In a ferroelectric switching system, a first and a second ferroelectric capacitor each being capable of being polarized in a first and a second direction of polarization, said capacitors being connected in series relationship by means coupling one electrode of said first capacitor to one electrode of said second capacitor, means applying to the other electrode of said first capacitor a pulse of a polarity to reverse the direction of polarization therein, and means including an impedance element for coupling the junction between said series connected capacitors to a reference potential, said impedance element presenting to said applied pulse an impedance less than that presented by said second capacitor when it is polarized in the opposite direction to said first capacitor and greater than the impedance presented by said second capacitor when it is polarized in the same direction as said first capacitor, whereby said applied pulse is effective to switch both said capacitors when said second capacitor is polarized in the same direction as said first capacitor and only said first capacitor when said second capacitor is polarized in the opposite direction to said first capacitor.

7. In a data storage system wherein binary information is stored in a coordinate array of ferroelectric capacitors each of which is capable of assuming two stable states of remanent polarization and each of which is connected between one of a plurality of row channels and one of a plurality of column channels, a first plurality of ferroelectric switching capacitors each having one of its electrodes coupled to a corresponding one of said row channels, a second plurality of ferroelectric switching capacitors each having one of its electrodes coupled to a corresponding one of said column channels, means for applying a biasing potential of one polarity to the switching capacitors in said first plurality and a biasing potential of opposite polarity to the switching capacitors in said second plurality, and means effective to coincidently apply to a selected switching capacitor in each said plurality a pulse of a polarity opposite to that applied to said capacitors by said biasing means and to terminate said pulse applied to sadi selected switching capacitor in said first plurality before said pulse applied to said selected switching capacitor in said second plurality.

References Cited in the file of this patent

UNITED STATES PATENTS

| | | |
|---|---|---|
| 2,691,154 | Rajchman | Oct. 5, 1954 |
| 2,734,184 | Rajchman | Feb. 7, 1956 |
| 2,734,187 | Rajchman | Feb. 7, 1956 |
| 2,736,880 | Forrester | Feb. 28, 1956 |

OTHER REFERENCES

Buck: Report R-212 of Digital Computer Laboratory of M.I.T., June 5, 1952.